US009232249B1

(12) United States Patent
Chakrovorthy et al.

(10) Patent No.: US 9,232,249 B1
(45) Date of Patent: Jan. 5, 2016

(54) VIDEO PRESENTATION USING REPEATED VIDEO FRAMES

(71) Applicant: AMAZON TECHNOLOGIES, INC., Reno, NV (US)

(72) Inventors: Sreeram Raju Chakrovorthy, Campbell, CA (US); Sapna Jayaram Rai, Campbell, CA (US); Shinjan Kumar Tiwary, Sunnyvale, CA (US)

(73) Assignee: Amazon Technologies, Inc., Reno, NV (US)

( * ) Notice: Subject to any disclaimer, the term of this patent is extended or adjusted under 35 U.S.C. 154(b) by 72 days.

(21) Appl. No.: 14/014,265

(22) Filed: Aug. 29, 2013

(51) Int. Cl.
*H04N 7/173* (2011.01)
*H04N 21/258* (2011.01)
*H04N 21/234* (2011.01)

(52) U.S. Cl.
CPC ... *H04N 21/25808* (2013.01); *H04N 21/23406* (2013.01); *H04N 21/23412* (2013.01)

(58) Field of Classification Search
CPC .................. H04N 21/23406; H04N 21/23412
USPC .......................................... 725/109, 110, 115
See application file for complete search history.

(56) References Cited

U.S. PATENT DOCUMENTS

2013/0148940 A1* 6/2013 Schmit et al. ................. 386/230
2013/0308919 A1* 11/2013 Shaw et al. ................... 386/239
2014/0292803 A1* 10/2014 Cook ............................ 345/619

* cited by examiner

*Primary Examiner* — Pankaj Kumar
*Assistant Examiner* — Sahar Baig
(74) *Attorney, Agent, or Firm* — Lindauer Law, PLLC

(57) ABSTRACT

A variety of media devices may stream and present content such as movies, music, audiobooks, and so forth. During streaming, data transfer rates may temporarily drop below that needed to maintain presentation. Described herein are techniques and systems for repeating presentation of previously received video frames. This repeated presentation allows for presentation of the content to continue uninterrupted, while providing time for the data transfer rate to regain a level capable of maintaining the presentation.

20 Claims, 11 Drawing Sheets

VIDEO PRESENTATION USING REPEATED VIDEO FRAMES

BACKGROUND

A wide variety of content is available for streaming delivery to media devices for presentation. The content may include audio, video, or both. The media devices may include televisions, set-top boxes, tablet computers, personal computers, gaming consoles, in-vehicle entertainment systems, portable media players, and so forth.

Traditionally, drops in data transfer rates result in cessation of content presentation or a transition to presentation of lower quality content, such as encoded at a lower bitrate. This cessation or transition to lower quality content may result in an undesirable user experience.

Figure 1:
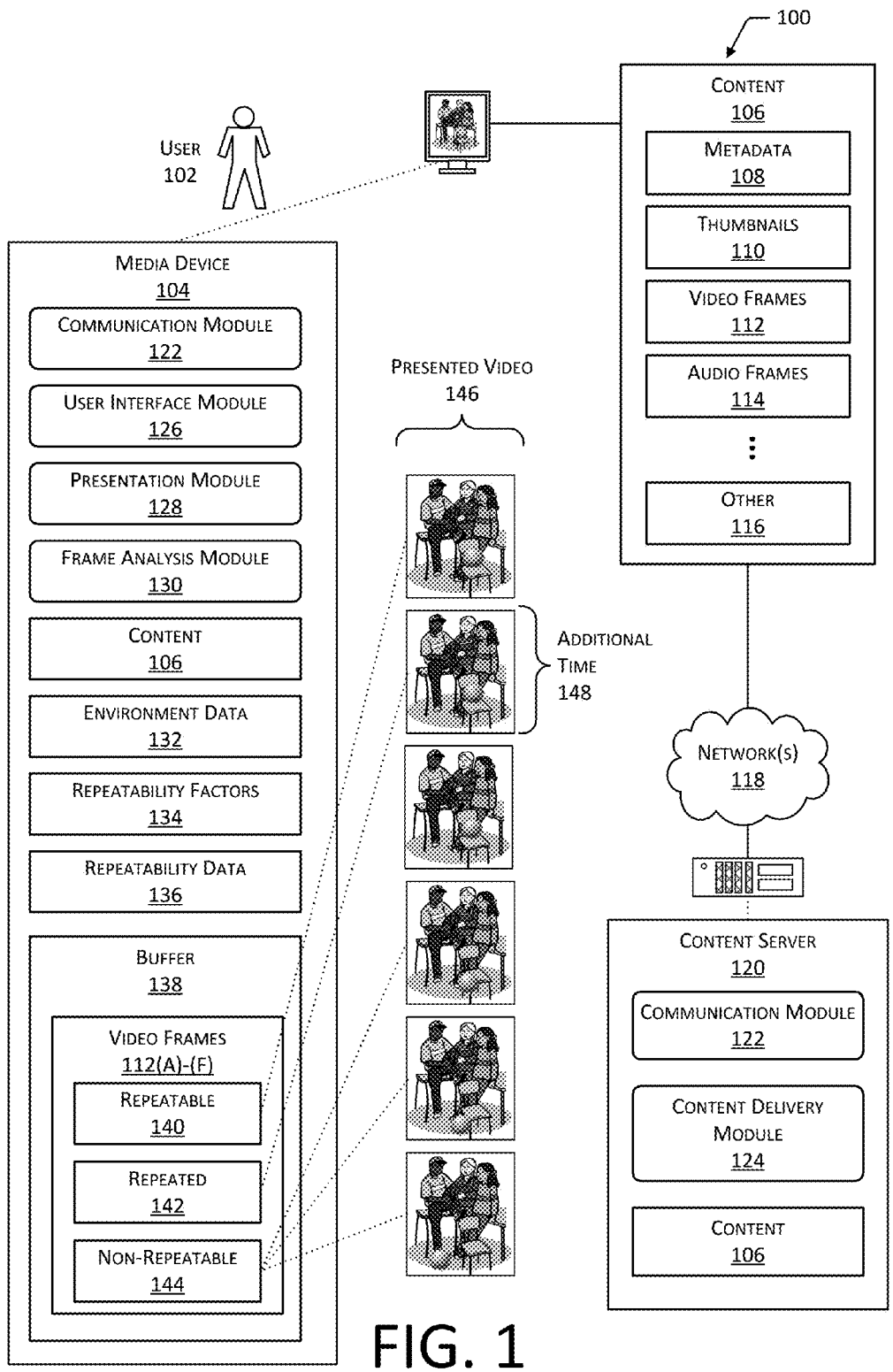
FIG. 1 is an illustrative system for video presentation when a data transfer rate is reduced by repeating presentation of one or more previously received video frames.

Certain implementations and embodiments will now be described more fully below with reference to the accompanying figures, in which various aspects are shown. However, various aspects may be implemented in many different forms and should not be construed as limited to the implementations set forth herein. Like numbers refer to like elements throughout.

DETAILED DESCRIPTION

Media devices present content to one or more users. The content may include audio, video, or both. For example, the content may include television shows, movies, audio books, and so forth.

The content may be streamed from one or more content servers to the media device. The media device may then present the content to the one or more users. Streaming comprises an incremental ongoing transmission of portions of the content. As portions are received, presentation may take place. Streaming allows for presentation to begin before the entire file has been downloaded. Streaming offers several advantages compared to local storage of the entire file of the content. Local storage requirements of the media device are reduced, lowering cost of the device. Content publishers or owners may be better able to determine content consumption statistics such as how many times a movie has been watched. Digital rights management may also be more easily applied and updated, helping to maintain intellectual property rights in the content.

Streaming utilizes a connection to the one or more content servers to receive portions of the content for presentation. The connection between the media device and the one or more content servers may use one or more networks. The data transfer rate between the media device and the one or more content servers may change from time to time. These changes in data transfer rate may result from changes in network routing, congestion at one or more points along the network, and so forth. For example, the data transfer rate may be 1.5 megabits per seconds ("Mbps") at time=0, drop to 0.75 Mbps at time=1, and increase to 1.6 Mbps at time=2. "Bit" or "bits" as used in this disclosure are indicative of a quantity of data transferred, stored, or otherwise manipulated for ease of discussion and not as a limitation. For example, the quantity of data may be expressed as bytes.

Video content may comprise a plurality of frames. A display output device presents these frames in sequence to produce apparent motion. Frame rates of between 15 and 120 frames per second may be used to provide video. For example, a frame rate of 60 frames per second ("fps") presents 60 frames in sequence for every second, with each frame presented on the display output device for about 1/60 of a second, or about 16.6 milliseconds ("ms").

For presentation of the video content to be maintained without dropouts, the frames are delivered to the display output device without interruption. Various situations may result in dropouts. For example, a delay or error in processing the video frames on the media device may delay or lose video frames. In another example, the data transfer rate between the media device and the one or more content servers providing the content may drop below that which is needed to deliver the video frames for ongoing presentation. Continuing the example above, the presentation may consume 1.5 Mbps of video frame data every second. Should the data transfer rate drop below 1.5 Mbps, such as at time=1 where the data transfer rate is 0.75 Mbps, presentation may fail.

To maintain presentation, the media device may buffer a portion of the streamed content. For example, the video frames received from the one or more content servers are stored in memory. Presentation may then use the buffered video frames. Over time, the buffer is refilled with additional video frames received from the one or more content servers. Without this refill, the buffer is exhausted and presentation is starved for video frames to present.

Traditional content servers may use adaptive bitrate streaming ("ABS") to deliver content. ABS responds to changes in the data transfer rate by delivering content of different quality at different times. For example, when the data transfer rate is above 1.5 Mbps, the content may be delivered in a high quality or high definition format. Continuing the example, when the data transfer rate is below 1.5 Mbps, the content may be delivered in a low quality or standard definition format.

ABS responds to changes in the data transfer rate by transitioning between different versions of the content based on the data transfer rate available. Each of these different versions may provide content of different quality. In one implementation, the different versions of the content may include a low quality low bitrate stream, a medium quality medium bitrate stream, and a high quality high bitrate stream.

While ABS streaming allows for ongoing presentation during changes in the data transfer rate, the transition from content of one quality to another may be noticeable to the user. For example, while streaming a movie the user may see the video presented on the screen change from a high definition picture to a lower definition picture. By minimizing or eliminating the number of such transitions, the user experience may be improved.

Described in this disclosure are techniques for maintaining presentation of video content at a given level of quality when a data transfer rate has momentarily dropped below a threshold level. Instead of exhausting the buffer and discontinuing presentation, or transitioning to lower quality, one or more video frames are presented more than once. The repeated frames are of the same quality, thus a user watching the presentation of the video experiences no transition from one quality to another. Repeated presentation may result in video which appears to be slowed down with respect to non-repeated presentation. To minimize the visual impact, the repeated frames may be those video frames which show little or no change between video frames. For example, a scene of an abandoned street may have little or no motion and thus may have several video frames eligible for repetition.

By repeating these video frames, additional time is provided to allow the data transfer rate to meet or exceed the threshold level. Thus, repeating the video frames may be considered to extend a length of time the buffer will take to empty. During this additional time, the data transfer rate may return to, or exceed, the threshold level. Other techniques such as discontinuing presentation, ABS, and so forth may be used in conjunction with repeating the frames, should the additional time be insufficient to provide for recovery of the data transfer rate.

In one implementation, the media device may be configured to generate repeatability data indicating video frames which are repeatable. Repeatability data may be determined based on analyzing the content, metadata about the content, environment data, and so forth, with respect to one or more repeatability factors. For example, the repeatability factors may specify that compressed video frames having a frame bit size below a frame size threshold may be designated as repeatable. Based on the repeatability data, one or more of the repeatable frames may be presented more than once. The presentation of the repeatable frames by the media device may be based at least in part on a reduction in the data transfer rate from the content server to the media device.

In another implementation, the repeatability data may be provided to the media device. For example, the content server may provide the content and repeatability data. Based at least in part on a reduction in the data transfer rate from the content server, the media device presents the video frames designated as repeatable frames.

Presentation of the repeatable frames may be based on one or more conditions. In one implementation, presentation may be based on the data transfer rate from the content server dropping below a transfer threshold. For example, the transfer threshold for a high quality piece of content may be 1.5 Mbps. In another implementation, presentation may be based on a ratio, which is based on a buffer refill rate and a buffer empty rate dropping below a buffer equilibrium value. For example, the buffer refill rate of 0.5 Mbps and the buffer empty rate of 1.5 Mbps results in a ratio of 0.33, indicating the buffer is providing video frames for presentation more quickly than additional video frames can be received. In other implementations, presentation may be based on one or more other conditions.

By repeating one or more of the repeatable frames indicated by the repeatability data, the media device may reduce the incidence of dropouts or transitions in content quality due to ABS. This reduction may improve the user experience while consuming streaming content, particularly in situations where the data transfer rate between the media device and the content server varies frequently.

Illustrative System

FIG. 1 is an illustrative system 100 for presenting repeated video frames. A user 102 is depicted with a corresponding media device 104 to present content 106 for consumption. While a single user 102 and a single media device 104 is shown, more than one user 102 may consume the content 106 at a given time, such as where multiple users 102 are watching the content 106 together.

The media device 104 may include televisions, tablet computers, personal computers, set-top boxes, gaming consoles, in-vehicle entertainment systems, portable media players, and so forth. The media device 104 includes or is communicatively coupled to one or more display output devices suitable for presenting video.

The media device 104 may be coupled to a remote control using a communication link. The remote control may serve as an input device or input/output device for the media device 104. For example, the remote control may include one or more of a touch sensor, button, accelerometer, gyroscope, camera, microphone, speaker, haptic output device, and so forth. The communication link may be optical, radio frequency, acoustic, and so forth. In one implementation, the communication link may use a personal area network interface, such as one compliant with the Bluetooth® specification. In some implementations, the remote control may comprise another device such as a smartphone, tablet computer, and so forth, which is communicatively coupled to the media device 104.

The content 106 may comprise metadata 108, thumbnails 110, video frames 112, audio frames 114, and other data 116. The metadata 108 comprises information about the content 106. For example, the metadata 108 may specify frame size in bits for a particular video frame 112. The metadata 108 may be embedded or encoded in the video frame 112, stored as a separate file, and so forth. The metadata 108 is discussed in more detail below with regard to FIG. 5.

The thumbnails 110 may comprise still images based on images in the video frames 112 at different points within a stream of the video frames 112. For example, the thumbnails 110 may contain sample images at two second intervals in the video frames 112, on a scene change, and so forth.

The video frames 112 comprise data representative of an image or a part of an image. A plurality of video frames 112 are presented in sequence on a display output device of the media device 104. The video frames 112 may be encoded using one or more encoding schemes. These encoding schemes may include data compression. In one implementation, the video frames 112 may be encoded such that they are decodable as described in the MPEG-2 standard promulgated by the Motion Pictures Experts Group ("MPEG"). In another implementation, the video frames 112 may be encoded using the H.264 standard developed by the Video Coding Experts Group ("VCEG") and the MPEG.

The audio frames 114 comprise audio information which may be associated with the video frames 112. For example, the audio frames 114 may be encoded using the MP2 MPEG-1 or MPEG-2 Audio Layer II format promulgated by the MPEG.

Other data 116 may be included in the content 106. For example, the other data 116 may include information associated with one or more digital rights management schemes.

The media device 104 may receive content 106 streamed over one or more networks 118 from one or more content servers 120. The one or more networks 118 may include one or more public networks such as the Internet, private networks, or a combination of both. The network 118 in turn couples to a plurality of content servers 120(1), 120(2), . . . , 120(S). As used in this disclosure, a letter within parenthesis such as "(S)" represents an integer value greater than zero. While a single content server 120 is depicted, in some implementations, the content server 120 or the functions attributed to the content server 120 may be provided by a plurality of devices. For example, the content server 120 may exist as a virtualized server executing across a plurality of physical servers.

The content server 120 may provide functions such as streaming content 106 to the media device 104 for presentation, authenticating user accounts, providing content lists, and so forth. The content server 120 may store, or have access to, one or more pieces of content 106. The content 106 may be provided using the network 118 to the media device 104.

The content server 120 may include a communication module 122 configured to establish and support communications with the media device 104 or other devices. For example, the communication module 122 may execute instructions which support transmission of data across a data network using the Transmission Control Protocol/Internet Protocol ("TCP/IP").

A content delivery module 124 is configured to stream the content 106 to one or more of the media devices 104. The streaming of the content 106 may be initiated by a request from the media device 104, by the content server 120, or another device.

One or more of the conditions on the content server 120, the network 118, the media device 104, and so forth, may affect the streaming of the content 106. For example, data congestion on the network 118 may impact a data transfer rate of portions of the content 106, such as the video frames 112.

The media device 104 may also have a communication module 122 configured to establish and support communications with the content server 120, other media devices 104, or other devices. A user interface module 126 of the media device 104 is configured to provide a user interface to the user 102 and accept inputs responsive to the user interface. The user interface may include one or more visual, audible, or haptic elements. For example, the user interface may be configured to provide a graphical user interface using the display which includes a control to navigate within the content 106.

A presentation module 128 is configured to present content 106 on, or in conjunction with, the media device 104. The presentation module 128 may be configured to receive streamed content 106 from an external source device such as the content server 120, another media device 104, and so forth. The presentation module 128 may support digital rights management, presentation of encrypted content 106, and so forth. The presentation module 128 may be configured to work in conjunction with the user interface module 126 to allow the user 102 to control presentation of the content 106.

The presentation module 128 is configured to repeat or present more than once one or more of the video frames 112 determined to be repeatable. For example, the presentation module 128 may be configured to present repeatable frames when the data transfer rate of the content 106 from the content server 120 drops below a transfer threshold level. The presentation module 128 may determine and utilize a repeatability tolerance which specifies how often and under what conditions repetition of the video frames 112 is used.

A frame analysis module 130 is configured to determine which video frames 112 in the content 106 may be repeated. The frame analysis module 130 may use as input one or more of the content 106, environment data 132, one or more repeatability factors 134, and so forth, to generate repeatability data 136 for the video frames 112(A)-(F) in a buffer 138. As described above, the video frames 112 received by the media device 104 may be stored in a buffer 138 prior to presentation by the presentation module 128. The video frames 112 received by the media device 104 may be stored regardless of whether the individual video frames 112 have expired, been delayed past a maximum time limit, and so forth. For example, video frames 112 which have been delivered too late for timely presentation may be stored in the buffer 138. The buffer 138 may be configured to fill and empty the video frames 112 in a first-in-first-out fashion.

The buffer 138 may be configured to store a fixed amount of data, or may vary in size during operation. For example, the buffer 138 may be dynamically adjusted during operation to increase or decrease the number of video frames 112 which may be stored. In some implementations, size of the buffer 138 may be based on one or more of the metadata 108, the environment data 132, and so forth.

The environment data 132 provides information indicative of the environment in which the delivery, processing, and presentation of the content 106 are taking place. For example, environment data 132 may include native resolution of the output display device in use by the media device 104, physical viewing distance from the output display device to the user 102, predicted bandwidth availability over time, and so forth. The environment data 132 is discussed in more detail below with regard to FIG. 5.

The repeatability factors 134 set out conditions under which the frame analysis module 130 determines a video frame 112 to be repeatable or non-repeatable. For example, the repeatability factors 134 may specify that a smallest percentile of the video frames 112 is repeatable. Continuing the example, the repeatability factors 132 may specify that video frames 112 having a bit size in the smallest decile are repeatable.

The repeatability data 136 provides information indicative of whether one or more video frames 112 are repeatable during presentation. For example, the repeatability data 136 may comprise a single bit flag set for video frames 112 which indicates that a particular video frame 112 may be repeated during presentation without adversely impacting the user experience.

The presentation module 128 is configured to access the buffer 138 and present repeatable frames 140, repeated frames 142, and non-repeatable frames 144 to provide presented video 146. The repeatable frames 140 are those that the repeatability data 136 indicate may be repeated. However, repeatable frames 140 are not necessarily repeated and may never be repeated during presentation. The repeated frames 142 are duplicates of the repeatable frames 140. The repeated frames 142 may be duplicated in the buffer 138 as shown here. In other implementations, the repeated frames 142 may result from instructions configured to present the repeatable frame 140 twice, without duplication in the buffer 138.

As illustrated here, the presented video 146 includes the repeatable frames 140, one or more repeated frames 142, and the non-repeatable frames 144. The presentation module 128 may present the repeated frames 142 responsive to a drop in the data transfer rate of the content 106 to the media device 104 from the content server 120 below a transfer threshold level. Due to the presence of the one or more repeated frames 142, additional time 148 has been provided. This additional time 148 may provide an opportunity for the data transfer rate to rise to or exceed the transfer threshold level, preventing or delaying a dropout or transition to a lower quality stream. As a result, the user experience while consuming the content 106 may be improved.

Figure 2:
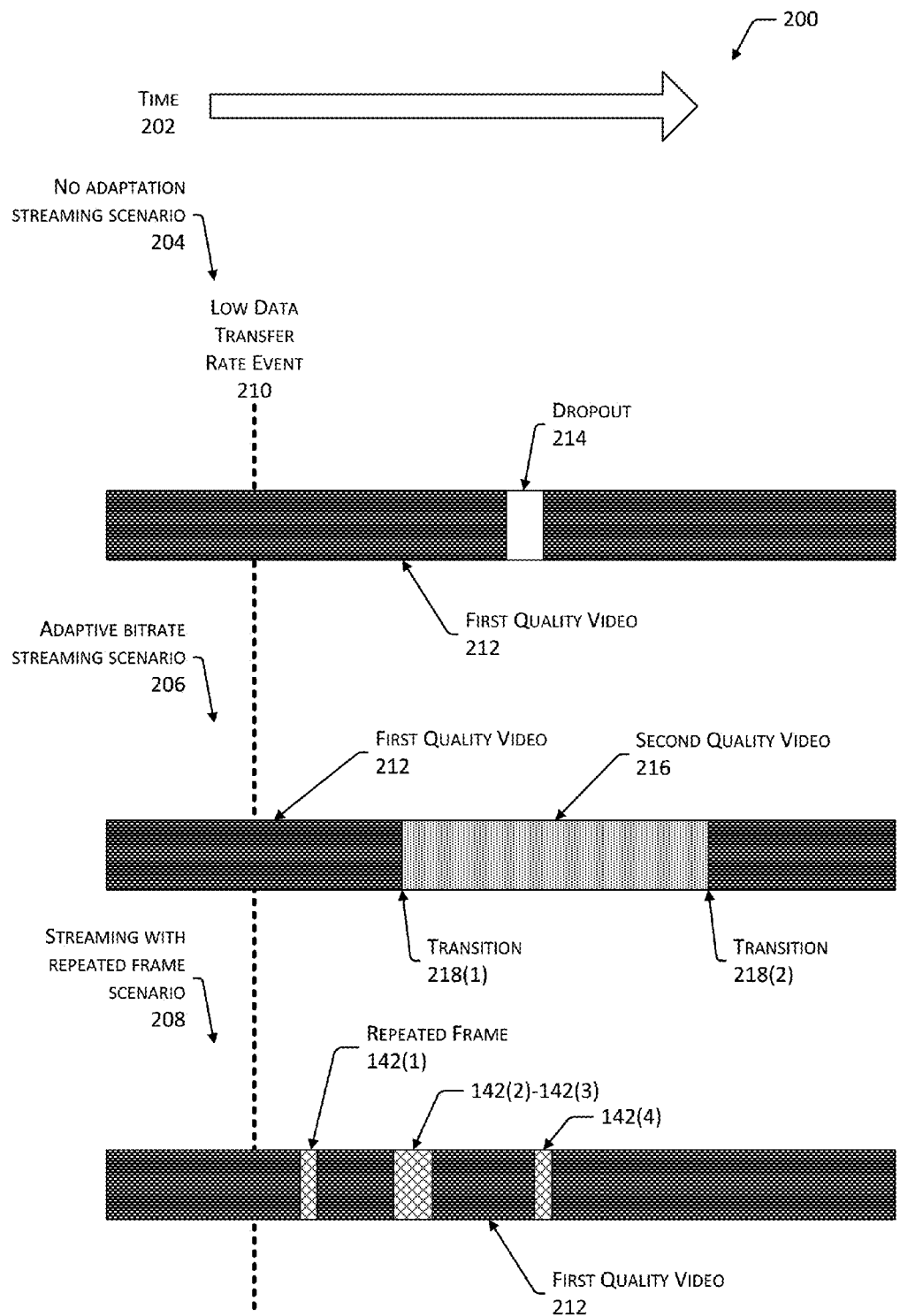
FIG. 2 illustrates a user experience for scenarios including no adaption, providing video at a lower bitrate, and repeating high quality frames in presented video.

FIG. 2 illustrates a user experience for several streaming scenarios 200. Because only a relatively small portion of the content 106 is stored on the media device 104, the network 118 connectivity between the content server 120 and the media device 104 impacts presentation. The content server 120 may be configured to provide content 106 in the highest quality available which can be transported by the available data transfer rate. For example, availability of a data transfer rate of 1.5 Mbps may result in the content delivery module 124 delivering a high bitrate high quality stream comprising non-interlaced video frames 112 with 1920×1080 at 30 frames per second ("fps").

In this illustration, arrow 202 indicates time, with time increasing from left to right on this page. Illustrated are what the user 102 will see presented on the output display device.

Depicted are a no adaptation streaming scenario 204, an adaptive bitrate streaming ("ABS") scenario 206, and a streaming with repeated frame scenario 208. A low data transfer rate event 210 is depicted by a broken line extending vertically on the page at a particular time. During this low data transfer rate event 210, data transfer rate has dropped below a transfer threshold level, resulting in the buffer 138 emptying faster than it is being refilled by incoming data from the content server 120. The duration of the low data transfer rate event 210 may have a duration ranging from a few milliseconds to several seconds.

In the no adaptation streaming scenario 204, the video frames 112 for first quality video 212 have been previously received and stored in the buffer 138. These video frames 112 are presented. Due to the low data transfer rate event 210, the buffer 138 has been starved, and as a result, at a later time a dropout 214 results. The user 102 may see this presented as a blank screen, missing data, frozen image, and so forth. The dropout 214 may be disconcerting and result in a negative user experience.

The ABS scenario 206 illustrates that the first quality video 212 is presented until the second quality video 216 is presented. As described above, ABS provides the advantage that the user 102 has not experienced the dropout 214. However, the user 102 has experienced a transition 218(1) from the first quality video 212 to the second quality video 216. For example, the user 102 sees the transition 218(1) from high definition video to standard definition video. After the low data transfer rate event 210 subsides and the data transfer rate is again sufficient to support the high first quality video 212, the user 102 will experience another transition 218(2) as the ABS adjusts.

In comparison, the streaming with repeated frame scenario 208 illustrated here eliminates the dropouts 214 and the transitions 218. The presented video 146 presented to the user 102 by the media device 104 presents the repeated frames 142. These repeated frames 142 may be distributed throughout the video frames 112 in the buffer 138. For example, as shown here a single repeated frame 142(1) is inserted, two consecutive repeated frames 142(2)-(3), and another single repeated frame 142(4) are inserted. Assuming the 30 fps frame rate, insertion of these four frames 142(1)-(4) allows the media device 104 an additional 133 ms to receive additional content 106. This time may allow the media device 104 to "ride out" a temporary decrease in the data transfer rate without a dropout 214 or triggering a transition 218. Because the repeated frames 142 are drawn from the buffer 138 already containing video frames 112 of the first quality video 212, no dropout 214 or transition 218 is apparent to the user 102 during presentation.

The repeated frames 142 may be distributed or separated from one another such that the user 102 does not readily perceive inclusion in the presented video 146. For example, the presentation module 128 may be configured to not repeat more than three consecutive video frames 112, not to repeat a total of more than 10% of the video frames 112 in the buffer 138, and so forth. Furthermore, the frame analysis module 130 may be configured to designate video frames 112 as repeatable which have little or no motion relative to an earlier or later video frame 112. As a result, the user experience is improved.

Figure 3:
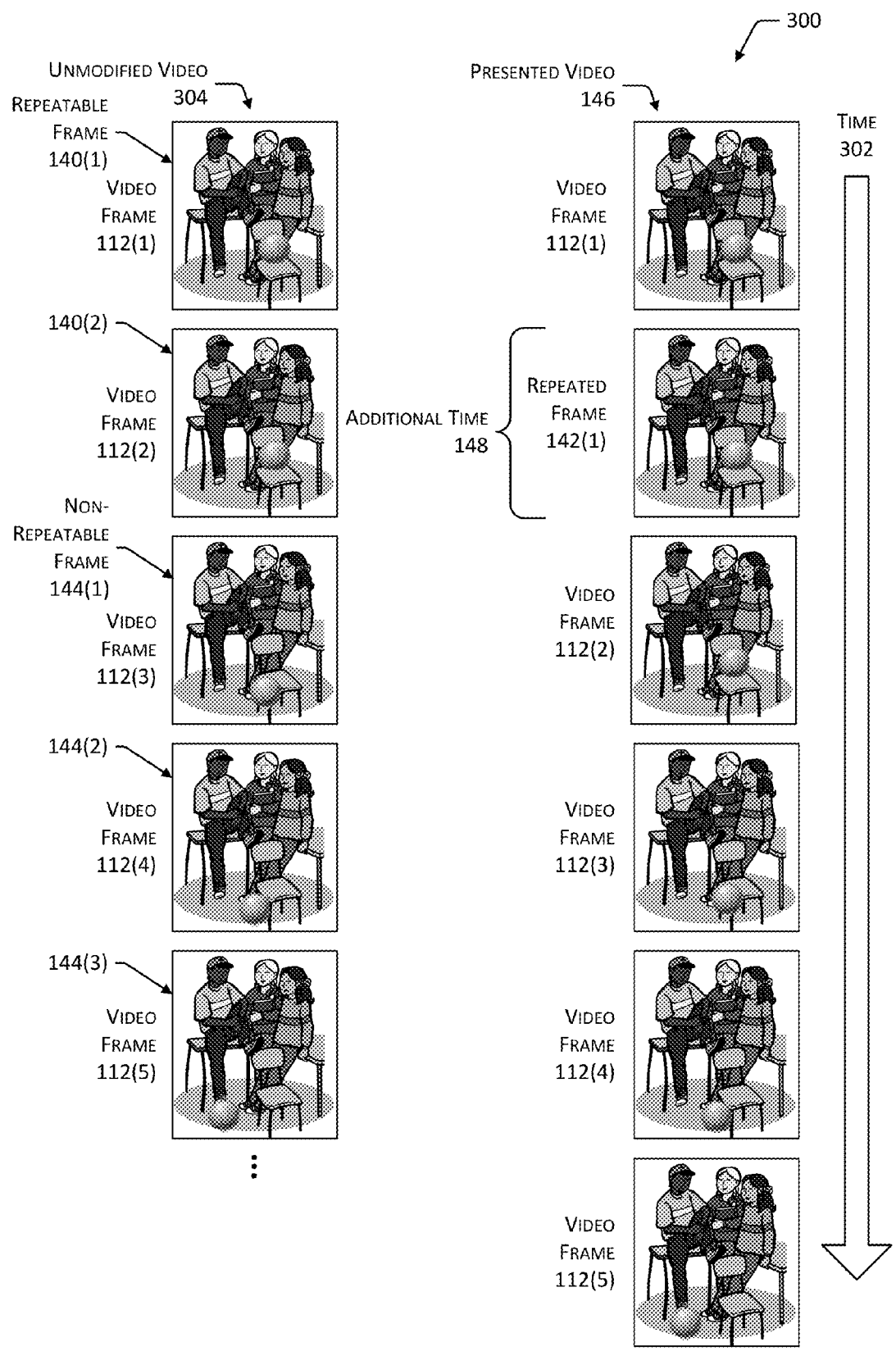
FIG. 3 illustrates sequences of frames for unmodified video and presented video which includes a repeated frame.

FIG. 3 illustrates sequences 300 of video frames 112. In this illustration, arrow 302 indicates time, with time increasing down the page. Unmodified video 304 is depicted. The unmodified video 304 is a sequence of the video frames 112 presented by the presentation module 128 when the data transfer rate is at or above a transfer threshold level. A section of the unmodified video 304 depicted here shows video frames 112(1)-(5). Video frames 112(1)-(2) are designated at repeatable frames 140(1)-(2). For example, the video frames 112(1)-(2) may be designated as repeatable as they have very little or no motion occurring in them. In comparison, the non-repeatable frames 144(1)-(3) contain motion of a basketball rolling off of a chair and onto the floor. Because of the change in position of the ball, the frames 144(1)-(3) are deemed non-repeatable because a repeat of these frames would result in an unnatural motion of the basketball. For example, a repeat of the video frame 112(4) may result in a presentation in which the basketball does not fall to the floor as expected, which may be disconcerting to the user 102 during viewing.

Also depicted is presented video 146, such as shown when the data transfer rate is below the transfer threshold level. In this illustration, repeated frame 142(1) duplicates video frame 112(1) and is presented before video frame 112(2). As a result of the presentation of the video frame 112(1) a second time, additional time 148 has accrued. As described above, this additional time 148 may provide an opportunity for the data transfer rate to recover to, or exceed, the transfer threshold level.

Figure 4:
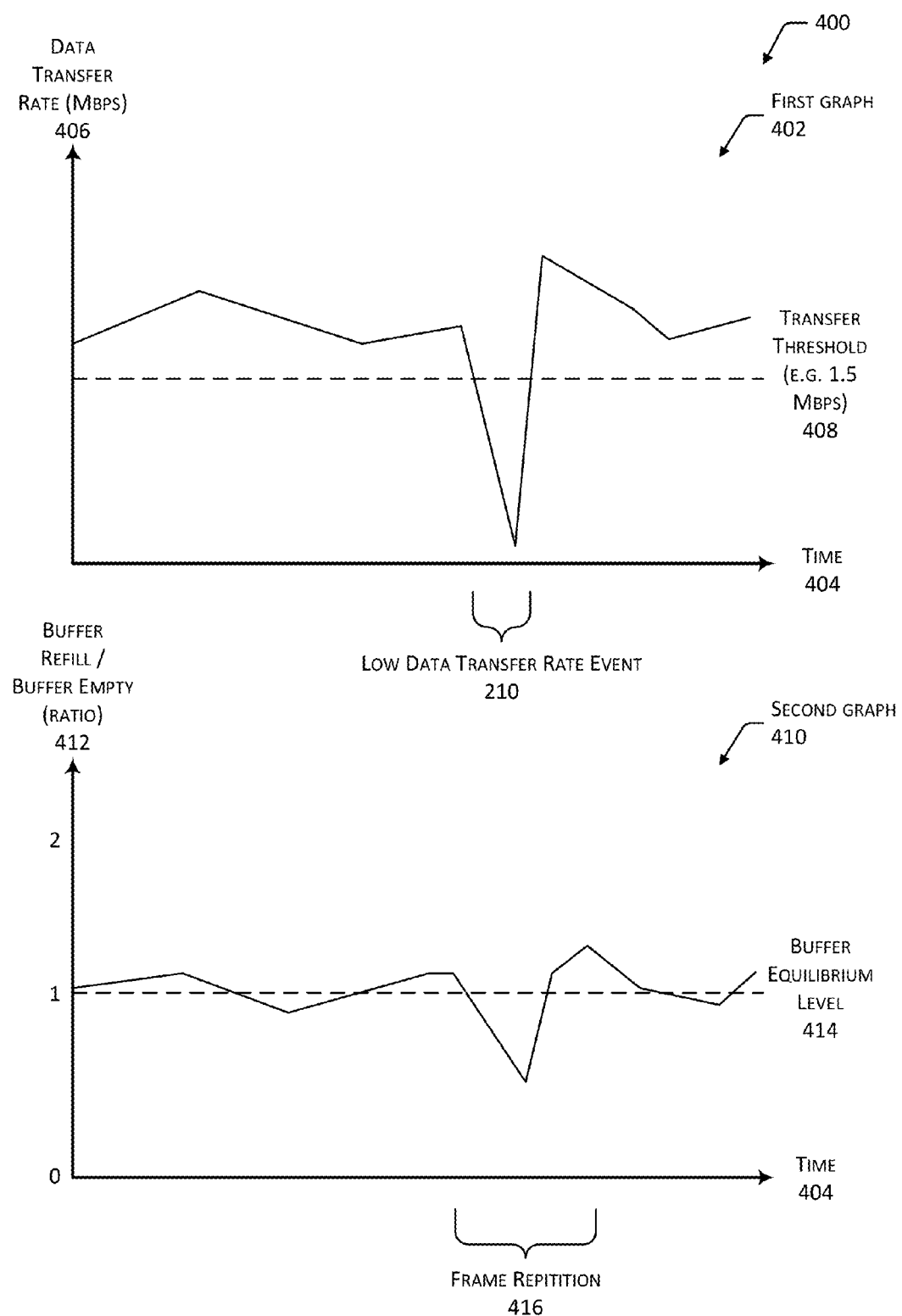
FIG. 4 depicts graphs of changes in data transfer rates over time and buffer refill rates over time and the use of repeated frames to maintain high quality presentation during a temporary drop in data transfer rate.

FIG. 4 depicts graphs 400 illustrating changes in data transfer rate 406 over time and impacts on the buffer 138. A first graph 402 has a horizontal axis which indicates increasing time 404, while a vertical axis indicates data transfer rate 406 in Mbps. A transfer threshold 408 indicates a data transfer rate 406 at which the video frames 112 of the content 106 are received at the media device 104 sufficient to support a particular quality of presentation, such as a high bitrate high definition video presentation using 1.5 Mbps.

As illustrated here, the data transfer rate 406 may vary over time. These variations may be due to one or more of the content server 120, the network 118, the media device 104, and so forth. A low data transfer rate event 210 may occur, during which the data transfer rate 406 drops below the transfer threshold 408. For example, the content server 120 may temporarily suspend transmission of the content 106 while resetting a network interface. As a result, the media device 104 begins to deplete the buffer 138. In many cases, the duration of a low data transfer rate event 210 may be short, on the order of 250 ms or less. However, this duration may be sufficient to trigger ABS, resulting in one or more transitions 218 as described above with regard to FIG. 2.

The presentation module 128 may be configured to control presentation of repeated frames 142 based at least in part on a comparison of the data transfer rate 406 to the transfer threshold 408. For example, the presentation module 128 may initiate frame repetition based on the data transfer rate 406 dropping below the transfer threshold 408, and discontinue frame repetition when the data transfer rate 406 rises above the transfer threshold 408.

The transfer threshold 408 may be statically configured or dynamically adjusted. For example, the presentation module 128 may dynamically adjust the transfer threshold 408 based on the bitrate associated with the content 106 being delivered to the media device 104.

A second graph 410 depicts time 404 along the horizontal axis while a vertical axis depicts a ratio 412 defined by buffer refill rate and buffer empty rate. The buffer refill rate indicates a quantity of data the buffer 138 is receiving per unit of time. The buffer refill rate may be expressed in bits per second, number of video frames 112 per second, and so forth. For example, the buffer refill rate may indicate 10 fps. The buffer empty rate indicates a quantity of data exiting the buffer 138, such as for presentation on the display output device. The buffer empty rate may be expressed in bits per second, number of video frames 112 per second, and so forth. For example, the buffer empty rate may indicate 30 fps.

Dividing the buffer refill rate by the buffer empty rate results in a ratio value 412. Where this ratio value 412 is equal to or greater than 1.0, the media device 104 is receiving enough streamed content 106 to maintain presentation without repeating frames, dropouts 214, or transitions 218. In comparison, a ratio value 412 less than 1.0 indicates that the media device 104 is not receiving enough streamed content 106 quickly enough to keep the buffer 138 filled and maintain uninterrupted presentation.

The presentation module 128 may be configured to control presentation of repeated frames 142 based at least in part on a comparison of the buffer refill/buffer empty ratio value 412 to the buffer equilibrium level 414. For example, the presentation module 128 may initiate a period of frame repetition 416 based on the buffer refill/buffer empty ratio value 412 dropping below 1.0, and discontinue frame repetition when the buffer refill/buffer empty ratio 412 reaches or exceeds 1.0.

In other implementations, the presentation module 128 may use other conditions to determine when to present repeated frames 142. For example, the content server 120 may provide other data 116 indicating a prediction of network congestion, resulting in frame repetition 416.

Figure 5:
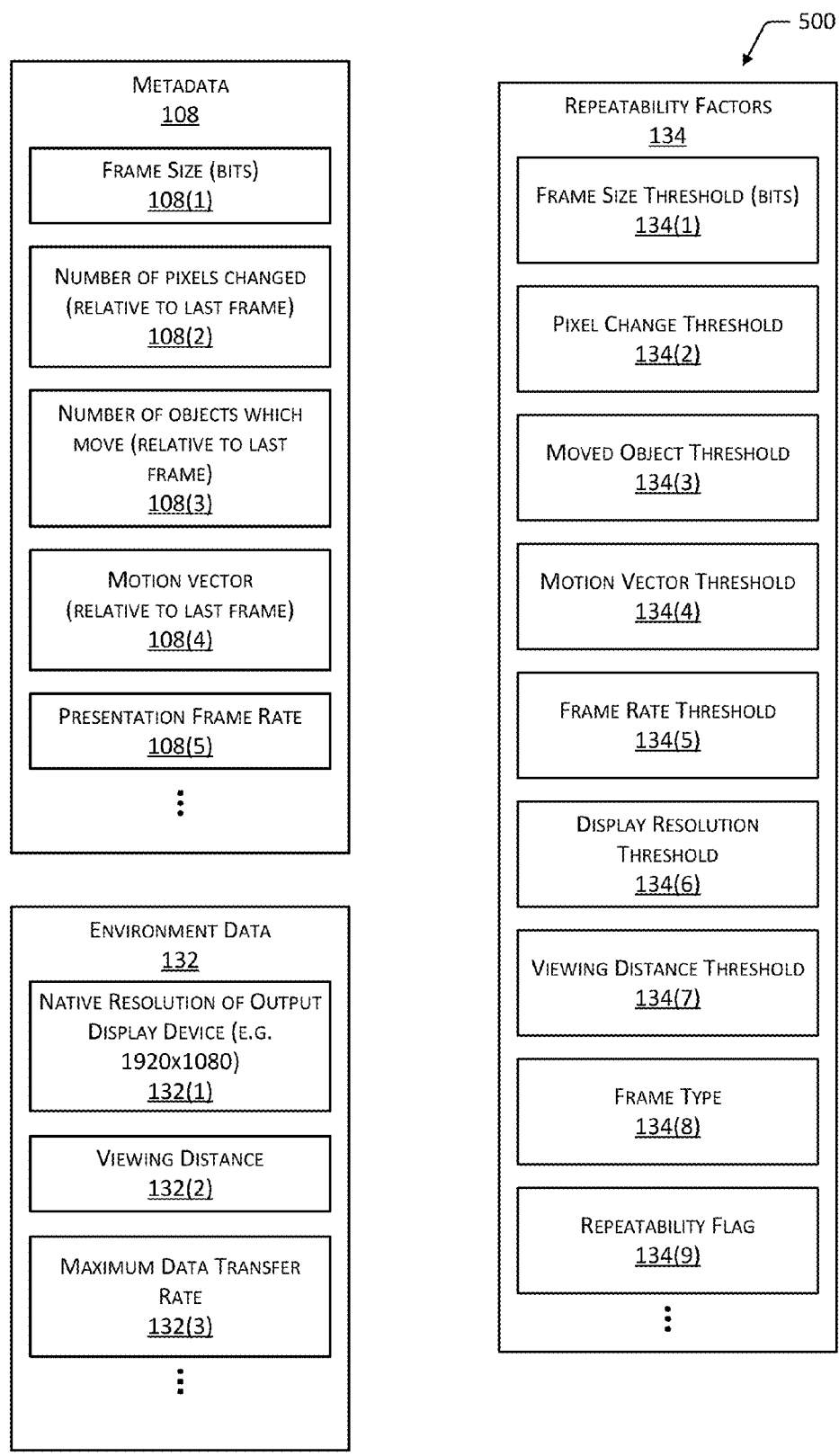
FIG. 5 illustrates block diagrams of data that may be used to determine repeatable frames, including metadata, environment data, and repeatability factors.

FIG. 5 illustrates block diagrams 500 of data that may be used to generate the repeatability data 136, determine the repeatable frames 140, or both. The frame analysis module 130 may access the metadata 108 for processing. The metadata 108 comprises information about the content 106. The metadata 108 may include frame size 108(1) indicative of the size of one or more video frames 112. The frame size 108(1) may be expressed in terms of bits, bytes, a dimensionless value, a relative value, and so forth. For example, the frame size 108(1) may be expressed as "small", "medium", or "large". Continuing the example, image compression algorithms may produce video frames 112 for static scenes that are relatively small. As a result, the frame size 108(1) may be used as an indicator for repeatability. The frame size 108(1) may be for compressed or uncompressed video frames 112.

A number of pixels changed relative to an earlier or later frame 108(2) may be indicated in the metadata 108. For example, this may indicate a number of pixels that have changed color, luminosity, and so forth. A number of objects that have moved or otherwise been displaced relative to an earlier or later frame 108(3) may be indicated. For example, for the presented video 146 depicted in FIG. 2, the number of objects 108(3) may be one, corresponding to the basketball falling from the chair to the ground. A motion vector 108(4) provides information about one or more objects that have moved or otherwise been displaced relative to an earlier or later frame. In some implementations, the motion vector 108(4) associated with a data encoding scheme may be used. For example, the motion vector 108(4) associated with an MPEG2 or MPEG4 encoding may be used. These metadata 108(2)-(4) may be used to determine video frames 112 that have little or no motion, and are thus suitable for repetition without disturbing the user 102.

A presentation frame rate 108(5) provides data indicating the intended or specified number of frames per second at which the video frames 112 are to be presented. For example, the presentation frame rate 108(5) may be 24 fps. At higher frame rates the tolerance to allow repetition may be relaxed, such that more video frames 112 may be repeated, compared to lower frame rates.

Other metadata 108(M) (not shown) may also be provided. For example, the other metadata 108(M) may include author name, artists name, title, content rating, digital rights management information, and so forth. The metadata 108 may be embedded or encoded in the video frame 112, stored as a separate file, and so forth.

The frame analysis module 130 may also access the environment data 132. The environment data 132 provides information indicative of the environment in which the delivery, processing, and presentation of the content 106 takes place. A native resolution of the output display device 132(1) may be provided. For example, the native resolution of the output display device 132(1) may indicate that a television attached to the media device 104 is able to natively present images with a resolution of 1920×1080 pixels, non-interlaced, at up to 120 fps.

A viewing distance 132(2) indicates a physical viewing distance from the output display device to the user 102. The viewing distance 132(2) may be manually entered, determined using one or more sensors, or a combination thereof. For example, the viewing distance 132(2) for a handheld tablet device may be preset to 1 meter. A tolerance to allow repetition may be based on the viewing distance 132(2). For example, greater repetitions may be permitted at greater viewing distances 132(2), where the user 102 is unable to see finer detail on the output display device.

Different pieces of environment data 132 may be combined for analysis by the frame analysis module 130. The frame analysis module 130 may set a tolerance for repeatability based on the native resolution 132(1) and the viewing distance 132(2). For example, a relatively low resolution display viewed at a relatively large distance may obscure finer detail, such that a relatively larger number of repetitions may go unnoticed.

The environment data 132 may include a maximum data transfer rate 132(3). For example, the maximum data transfer rate 132(3) may be indicative of a maximum network interface link throughput. Given the maximum data transfer rate 132(3), the presentation module 128 may determine for how long to engage in video frames 112 repetition. For example, at a certain point in time, the low data transfer rate event 210 has persisted so long that repetition is insufficient to provide additional time 148 to refill the buffer 138 as constrained by the maximum data transfer rate 132(3). In such a situation, the presentation module 128 may activate ABS to transfer the content 106, which requires a lesser data transfer rate 406.

The environment data 132 may include other information 132(E) (not shown), such as processor utilization of the media device 104, video pipeline processing delay information, pending system maintenance tasks, and so forth. For example, the environment data 132 may include messages indicating that congestion on the network 118 is increasing and a decrease in data transfer rate 406 is imminent.

The repeatability factors 134 set out conditions under which the frame analysis module 130 determines a video frame 112 to be repeatable 140 or non-repeatable 144. The repeatability factors 134 may include a frame size threshold 134(1). The frame size threshold 134(1) specifies a size of frames in terms of bits, bytes, a dimensionless value, a relative value, and so forth, which may be used to determine repeatability. For example, the frame size threshold 134(1) may be expressed as "small", "medium", or "large". The frame analysis module 130 may compare the frame size 108 (1) with the frame size threshold 134, such that frame sizes 108(1) below the frame size threshold 134 are designated as repeatable frames 140. In situations where the video frames 112 are compressed, such as with a lossy compression scheme, smaller video frames 112 may be representative of images of a relatively static scene containing little or no movement.

A pixel change threshold 134(2) specifies a number of pixels changed relative to an earlier or later frame 108(2), which may be used to determine repeatability. For example, the pixel change threshold 134(2) may indicate that video frames 112 that have less than 300 pixel changes relative to an earlier or later frame are able to be designated as repeatable 140. In some implementations, the pixel change threshold 134(2) may specify a number of adjacent pixels. The pixel change threshold 134(2) may be used by the frame analysis module 130 to analyze the number of pixels changed relative to an earlier or later frame 108(2).

The repeatability factors 134 may include a moved object threshold 134(3). This threshold indicates a number of objects that have moved or otherwise been displaced relative to an earlier or later frame, which may result in designation of repeatability. For example, the moved object threshold 134(3) may specify that video frames 112 having the number of objects that move 108(3) of two or fewer are designated as repeatable 140.

A motion vector threshold 134(4) specifies vector values which, when not exceeded, may be used by the frame analysis module 130 to determine a video frame 112 is repeatable 140. For example, video frames 112 in which the motion vector 108(4) is below the motion vector threshold 134(4) may be determined to be repeatable 140.

The media device 104 may use a frame rate threshold 134(5) to determine repeatability. For example, the frame analysis module 130 may raise the pixel change threshold 134(2) when the content 106 is presented at higher frame rates.

A display resolution threshold 134(6) may be used to determine repeatability. For example, when the native resolution of the output display device 132(1) is below the display resolution threshold 134(6), additional video frames 112 may be designated as repeatable 140.

The frame analysis module 130 may determine repeatability using a viewing distance threshold 134(7). For example, where the viewing distance 132(2) exceeds two meters, the frequency of repetition may be increased.

A frame type 134(8) may also be used to determine repeatability. For example, the video frames 112 compliant with MPEG2 may be categorized as being a frame type 134(8) such as a key frame, predictive frame, bidirectional predicted frame, and so forth. The video frames 112 having a frame type 134(8) of key frame may be designated as non-repeatable 144 by the frame analysis module 130.

A repeatability flag 134(9) may indicate whether the video frame 112 is repeatable 140 or non-repeatable 144. For example, the repeatability flag 134(9) value of "1" may be used by the frame analysis module 130 to determine video frames 112 that are repeatable. In some implementations, the repeatability data 136 may be received from another device, such as the content server 120.

Other repeatability factors 134(R) (not shown) may also be considered to determine when the video frame 112 is repeatable 140. For example, an average luminosity threshold may be used to allow for increased repetition of dark or dim images relative to brightly lit images.

While the examples above illustrate the use of various repeatability factors 134 to determine repeatability, the analysis may be inverted such that non-repeatability is determined. Furthermore, the presentation module 128 may perform one or more of the analyses discussed above. Additionally, the repeatability factors 134 may be used alone or in combination with one another. For example, repeatability may be based on the frame size threshold 134(1), pixel change threshold 134 (2), frame rate threshold 134(5), and so forth.

Figure 6:
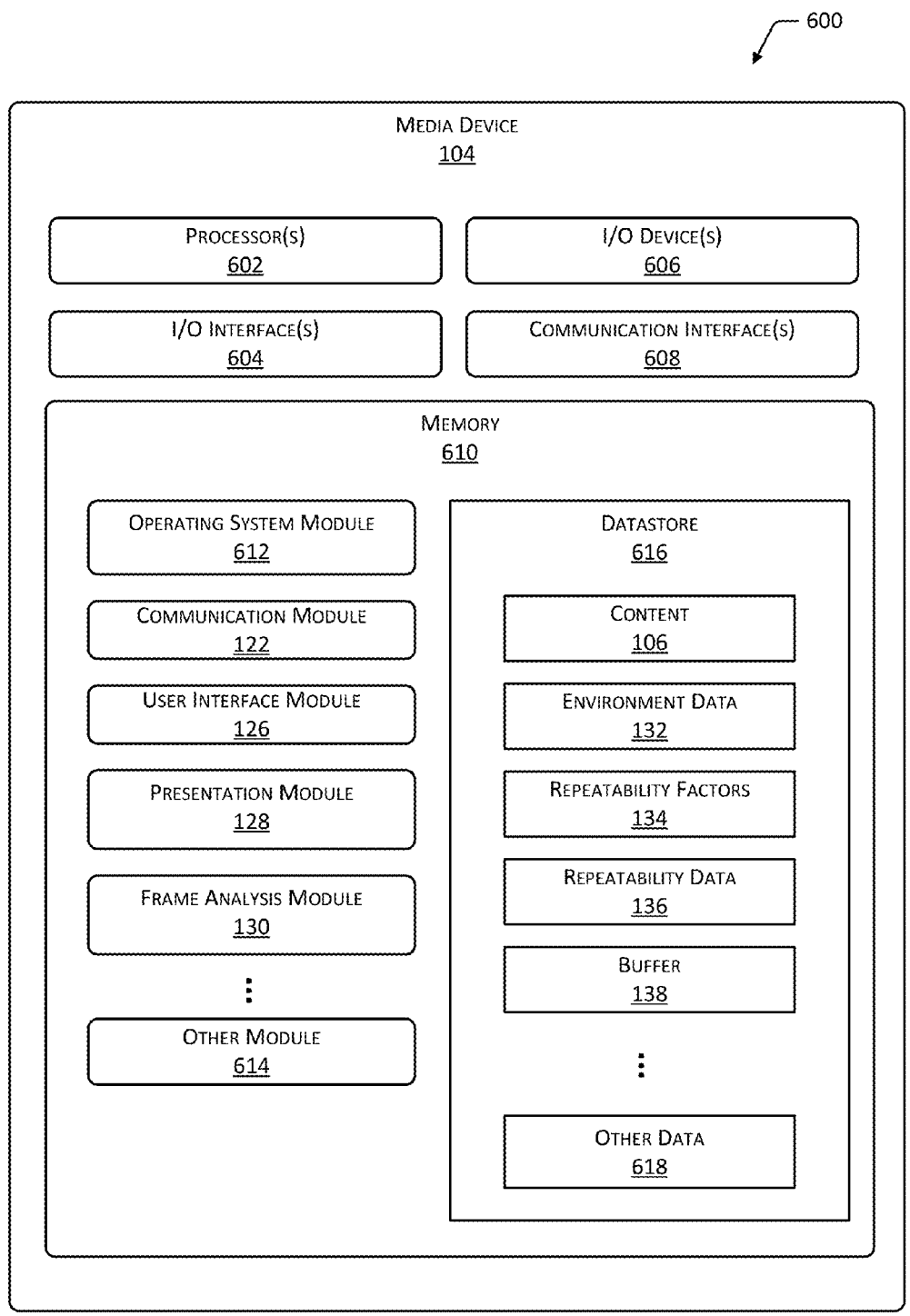
FIG. 6 illustrates a block diagram of a media device configured to provide presented video with one or more repeated frames.

FIG. 6 illustrates a block diagram 600 of the media device 104. As described above, the media device 104 may be configured to repeat presentation of one or more video frames 112.

The media device 104 may include one or more processors 602 configured to execute one or more stored instructions. The processor(s) 602 may comprise one or more cores. The media device 104 may include one or more input/output ("I/O") interface(s) 604 to allow the processor(s) 602 or other portions of the media device 104 to communicate with other devices. The I/O interfaces 604 may comprise Inter-Integrated Circuit ("I2C"), Serial Peripheral Interface bus ("SPI"), Universal Serial Bus ("USB"), RS-232, a media device interface such as High Definition Multimedia Interface ("HDMI"), and so forth.

The I/O interface(s) 604 may couple to one or more I/O devices 606. The I/O devices 606 may include input devices such as one or more of a camera, a microphone, a touch sensor, a button, and so forth. The I/O devices 606 may also include output devices such as one or more of a display, audio speakers, haptic output devices, and so forth. In some embodiments, the I/O devices 606 may be physically incorporated with the media device 104 or may be externally placed and communicatively coupled thereto.

The I/O interfaces 604 may include one or more media device interfaces. The media device interfaces allow for the exchange of information between the media device 104 and other media devices 104. The media device interface may include one or more of a HDMI®, TOSLINK®, Ethernet, analog video, analog audio, IEEE 1394, USB, Bluetooth®, ZigBee®, and so forth. The media device interfaces may allow for wired or wireless communication between the media device 104 and the other media devices 104.

The media device 104 may also include one or more communication interfaces 608. The communication interfaces 608 are configured to provide communications between the media device 104 and other devices. The communication interfaces 608 may include personal area networks, wireless local area networks, wireless wide area networks, and so forth. The media device 104 may communicate with the remote control using one or more of the communication interfaces 608. For example, the media device 104 may communicate with the remote control using a Bluetooth® personal area network.

The media device 104 may also include one or more busses or other internal communications hardware or software that allow for the transfer of data between the various modules and components of the media device 104.

As shown in FIG. 6, the media device 104 includes one or more memories 610. The memory 610 comprises one or more computer-readable storage media ("CRSM"). The buffer 138 may comprise a portion of the memory 610, a dedicated memory device, and so forth. The CRSM may be any one or more of an electronic storage medium, a magnetic storage medium, an optical storage medium, a quantum storage medium, a mechanical computer storage medium, and so forth. The memory 610 provides storage of computer readable instructions, data structures, program modules, and other data for the operation of the media device 104.

The memory 610 may include at least one operating system ("OS") module 612. The OS module 612 is configured to manage hardware resource devices such as the I/O interfaces 604, the I/O devices 606, the communication interfaces 608, the device interfaces, and provide various services to applications or modules executing on the processors 602. Also stored in the memory 610 may be the communication module 122, the user interface module 126, the presentation module 128, and the frame analysis module 130.

As described above, the communication module 122 is configured to establish and support communications between the media device 104 and other devices. The communication module 122 may access the communication interfaces 608 to exchange information. For example, the communication module 122 may be configured to request content 106 from the content server 120 using the network 118.

As described above, the user interface module 126 is configured to provide the user interface to the user 102 using the I/O devices 606 and accept inputs received from the user input I/O devices 606. The user interface may include one or more visual, audible, or haptic elements.

The presentation module 128 is configured to present content 106 on the media device 104 or another device communicatively coupled thereto, such as a television connection using HDMI®. The presentation module 128 is configured to receive content 106 streamed from an external source device such as the content server 120 or another media device 104, such as in a peer-to-peer configuration.

The presentation module 128 is configured to repeat or present more than once one or more of the video frames 112 determined to be repeatable 140. The determination as to which video frames 112 are repeatable 140 may be provided by the frame analysis module 130, or in some implementations, may be received as repeatability data 136 from the content server 120.

The presentation module 128 may also determine when to initiate and when to discontinue repetition. As described above with regard to FIG. 4, the presentation module 128 may initiate frame repetition 416 such as when the data transfer rate 406 from the content server 120 to the media device 104 drops below the transfer threshold 408, or when the buffer refill/buffer empty ratio 412 drops below 1.0. As described above, the presentation module 128 may dynamically adjust the repeatability tolerance that specifies how often and under what conditions repetition is used.

The frame analysis module 130 is configured to use the repeatability factors 134 to determine which video frames 112 may be designated as repeatable 140. The frame analysis module 130 may use as input one or more of the content 106, environment data 132, and so forth, to generate the repeatability data 136 for the video frames 112(A)-(F) in a buffer 138.

Other modules 614 may be stored in the memory 610. For example, a digital rights management module may work in conjunction with the presentation module 128 to facilitate access to content 106.

The memory 610 may also include a datastore 616 to store information. The datastore 616 may use a flat file, database, linked list, tree, or other data structure to store the information. In some implementations, the datastore 616 or a portion of the datastore 616 may be distributed across one or more other devices including servers, network attached storage devices, and so forth.

The datastore 616 may store a portion of the content 106, such as that in the buffer 138. The datastore 616 may also store one or more of the environment data 132, the repeatability factors 134, or repeatability data 136. Other data 618 may also be stored, such as user preferences, account login information, and so forth.

Figure 7:
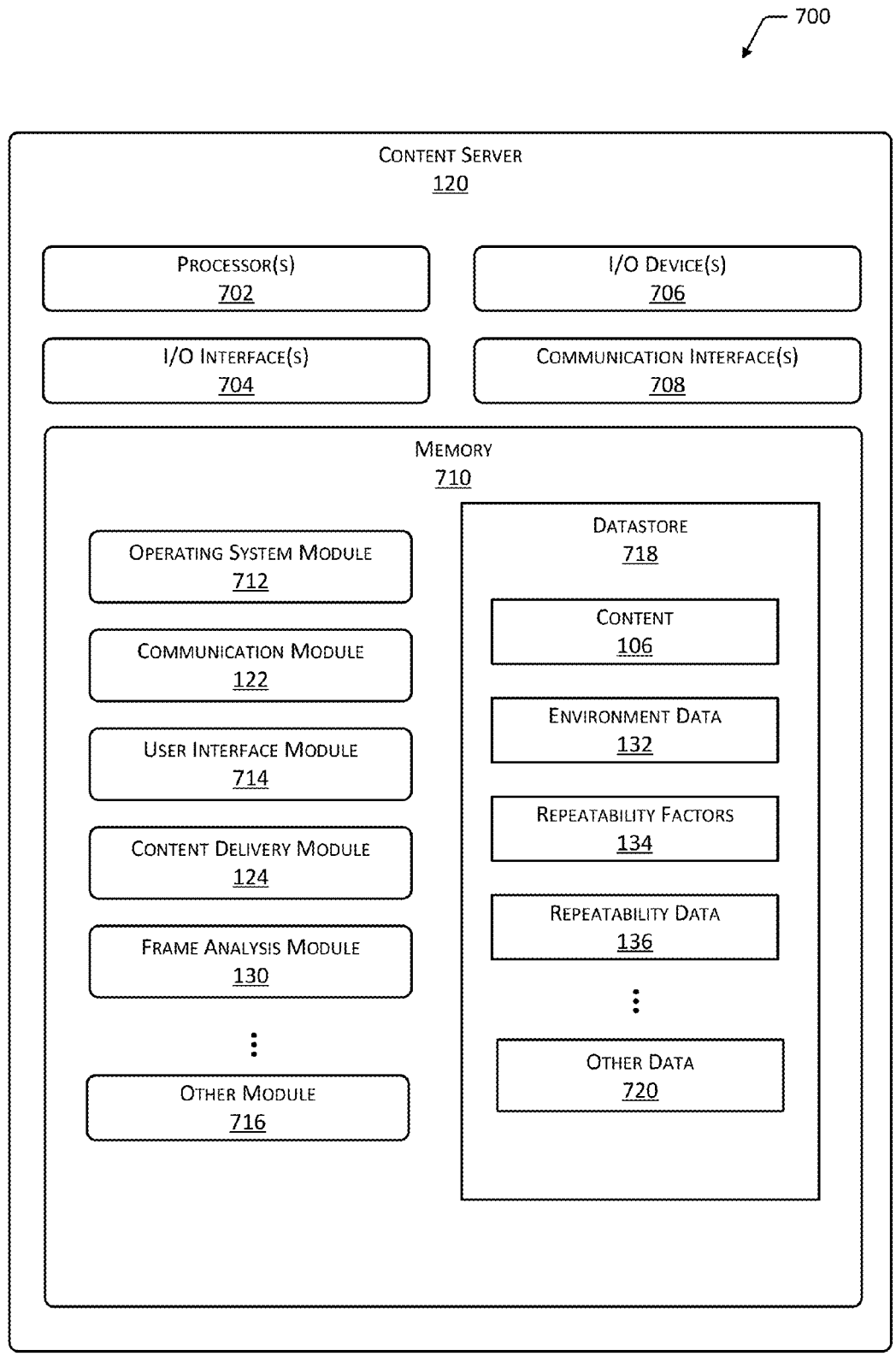
FIG. 7 illustrates a block diagram of a content server configured to deliver content to the media devices.

FIG. 7 illustrates a block diagram 700 of the content server 120 configured to stream the content 106 to the media device 104. In some implementations, the content server 120 may be configured to generate repeatability data 136 for distribution to the media device 104. The functions associated with the content server 120 described in this disclosure may be implemented as one or more servers and by one or more entities. For example, in one implementation, one server may provide and distribute the content 106 while another generates the repeatability data 136. The one or more servers may be physical server devices or virtual servers executing on physical server devices.

The content server 120 may include one or more processors 702 configured to execute one or more stored instructions. The processors 702 may comprise one or more cores. The content server 120 may include one or more I/O interface(s) 704 to allow the processor 702 or other portions of the content server 120 to communicate with other devices. The I/O interfaces 704 may comprise I2C, SPI, USB, RS-232, and so forth.

The I/O interface(s) 704 may couple to one or more I/O devices 706. The I/O devices 706 may include input devices such as one or more of a keyboard, a touch sensor, and so forth. The I/O devices 706 may also include output devices such as one or more of a display, printer, and so forth. In some embodiments, the I/O devices 706 may be physically incorporated with the content server 120 or may be externally placed and communicatively coupled thereto.

The content server 120 may also include one or more communication interfaces 708. The communication interfaces 708 are configured to provide communications between the content server 120 and other devices such as the media device 104. The communication interfaces 708 may include wireless local area networks, wireless wide area networks, and so forth. For example, the communication interfaces 708 may include an Ethernet interface which connects to the network 118.

The content server 120 may also include one or more busses or other internal communications hardware or software that allow for the transfer of data between the various modules and components of the content server 120.

As shown in FIG. 7, the content server 120 includes one or more memories 710. The memory 710 comprises one or more CRSM. The memory 710 provides storage of computer readable instructions, data structures, program modules, and other data for the operation of the content server 120.

The memory 710 may include at least one OS module 712. The OS module 712 is configured to manage hardware resource devices such as the I/O interfaces 704, the I/O devices 706, the communication interfaces 708, and so forth, and provide various services to applications or modules executing on the processors 702. Also stored in the memory 710 may be the communication module 122, a user interface module 714, the content delivery module 124, and the frame analysis module 130.

As described above, the communication module 122 is configured to establish and support communications between the media device 104 and other devices. The communication module 122 may access the communication interfaces 708 to exchange information. For example, the communication module 122 may be configured to stream the content 106 to the media device 104 using the network 118.

The user interface module 714 is configured to provide a user interface to the user 102 or to the media device 104. In one implementation, the user interface may be a web interface presented via the network 118 and accessible to the users 102. In another implementation, the user interface may comprise an application programming interface ("API") that enables communication such as sending requests for content 106 from the media device 104 to the content server 120.

As described above, the content delivery module 124 is configured to stream the content 106 to one or more of the media devices 104. The streaming of the content 106 may be initiated by a request from the media device 104, by the content server 120, or another device. For example, in some implementations, the user 102 may use a third device to initiate streaming from the content server 120 and presentation on the media device 104.

In one implementation, the content server 120 may be configured to provide repeatability data 136 to the media device 104. In this implementation, the content server 120 may execute a frame analysis module 130 configured to generate the repeatability data 136 as described above. Instead of analyzing the video frames 112(A)-(F) in the buffer 138, the frame analysis module 130 on the content server 120 may analyze at least a portion of the content 106. The frame analysis module 130 may be configured to acquire environment data 132 from one or more of the media devices 104. In some implementations, the repeatability data 136 may be generated for a particular media device 104, or a group or bucket of media devices 104(D) having one or more similar characteristics.

Other modules 716 may be stored in the memory 710. For example, an authentication module may be configured to authorize delivery of the content 106 to a particular media device 104.

The memory 710 may also include a datastore 718 to store information. The datastore 718 may use a flat file, database, linked list, tree, or other data structure to store the information. In some implementations, the datastore 718 or a portion of the datastore 718 may be distributed across one or more other devices including servers, network attached storage devices, and so forth.

The datastore 718 may store the content 106 for distribution, the environment data 132, the repeatability factors 134, the repeatability data 136, or other data 720. For example, the other data 720 may include administrator preferences, account information associated with the user 102, and so forth.

Illustrative Processes

Figure 8:
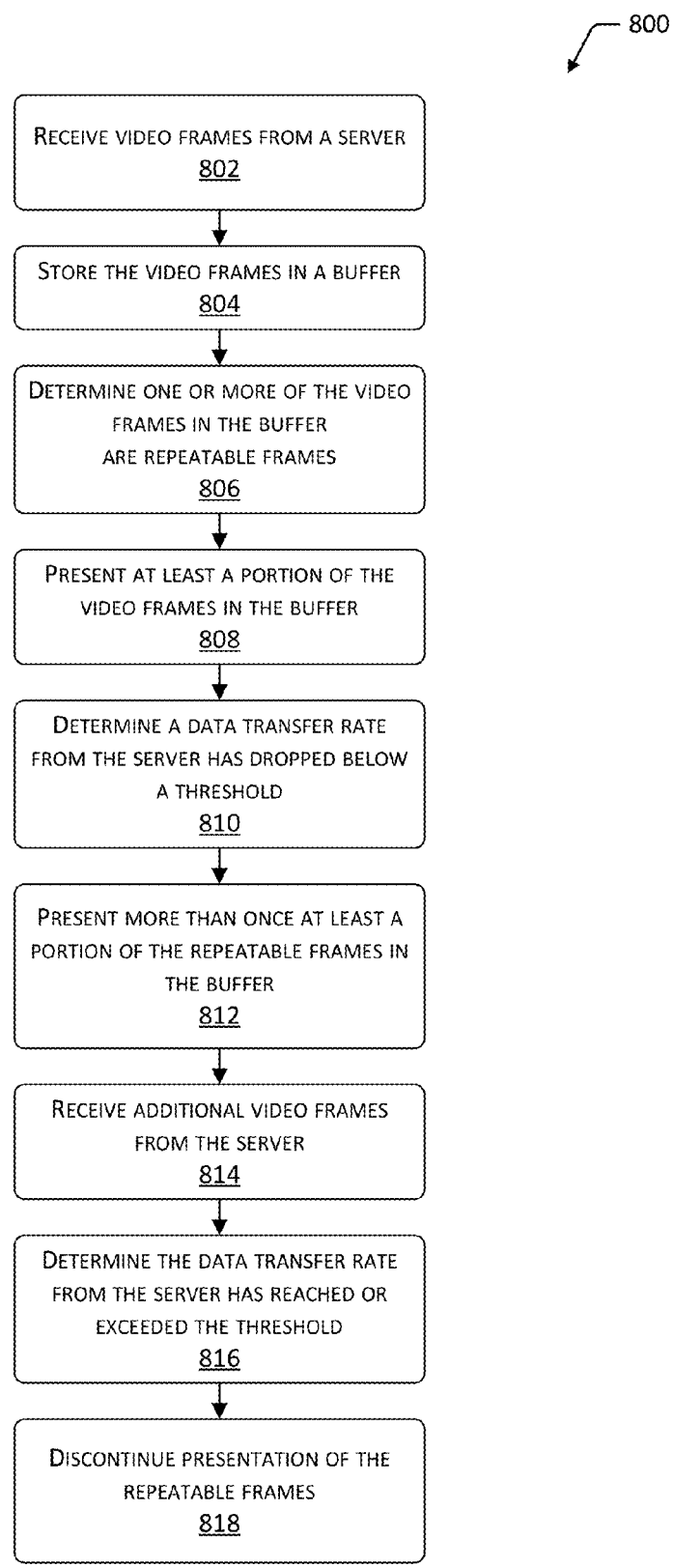
FIG. 8 is a flow diagram of a process of generating presented video including one or more repeated frames.

FIG. 8 is a flow diagram of a process 800 of generating the presented video 146 including one or more repeated frames 142. The presentation module 128, the frame analysis module 130, or both may implement this process.

Block 802 receives the video frames 112. These video frames 112 may be received at a data transfer rate 406. The data transfer rate 406 may vary over time, such that different video frames 112 are received at different data transfer rates 406. For example, the media device 104 may receive the content 106 with the communication interface 608 from the content server 120. The content 106 may be delivered in a compressed or uncompressed format. For example, the content 106 may be compressed using the MPEG4 standard. The media device 104 may decode the content 106 to generate the video frames 112. In one implementation, the content 106 may be received by the media device 104 from the content server 120 using a wide area network, such as the Internet. In another implementation the content 106 may be received from another media device 104 using a local area network or a personal area network. For example, a tablet media device 104(1) may stream the content 106 to a television media device 104(2) over a Wi-Fi® connection.

Block 804 stores the video frames 112(A)-(F) in the buffer 138. As described above, the buffer 138 may comprise a dedicated memory device or a location within the memory 610.

Block 806 determines one or more of the video frames 112(A)-(F) in the buffer 138 are repeatable frames 140. For example, the determination may designate as repeatable frames 140 those with little or no movement across two or more video frames 112. In another example, designation as a repeatable frame 140 may be based on comparison of a bit size of the video frame 112 with a threshold size. For example, video frames 112 of less than 30 kilobits may be designated as a repeatable frame 140.

Block 808 presents at least a portion of the video frames 112(A)-(F) in the buffer 138. For example, video frames 112(1)-112(1301) from the buffer 138 may be presented on a display output device coupled to the media device 104 using HDMI®. In one implementation, the repeated frame 142 may be copied or duplicated in the buffer 138. In another implementation, the presentation module 128 may be configured to read the repeatable frame 140 twice.

Block 810 determines the data transfer rate 406 is below a threshold. The threshold may be based on, or associated with, the bitrate used to stream the content 106 to the media device 104. In one implementation, as described above with regard to FIG. 4, the threshold may be the transfer threshold 408. The transfer threshold 408 may specify a minimum data transfer rate 406 with the content server 120 to receive video frames 112 in order to maintain presentation. For example, due to congestion on the network 118, the data transfer rate 406 may have dropped from 1.6 Mbps to below the 1.5 Mbps transfer threshold 408 necessary to support ongoing presentation of high definition video.

In another implementation, as also described above with regard to FIG. 4, the threshold may be based on the buffer refill rate and the buffer empty rate. For example, the buffer refill rate indicates a number of frames entering the buffer 138 per unit of time, and the buffer empty rate indicates a number of frames in the buffer 138 removed from the buffer 138 per unit of time. This threshold may be expressed as a ratio 412 resulting from the buffer refill rate as the dividend and the buffer empty rate as the divisor.

Block 812 presents more than once at least a portion of the repeatable frames 140 in the buffer 138. This presentation may be based at least in part on the determination by block 810.

Block 814 receives additional video frames 112(G)-(X). For example, even with the diminished data transfer rate 406, the content server 120 may have continued to deliver some of the video frames 112 at a slower rate.

Block 816 determines the data transfer rate 406 has reached or exceeded the transfer threshold 408. For example, the congestion on the network 118 may have subsided, and the data transfer rate 406 has returned to 1.6 Mbps, above the transfer threshold 408 of 1.5 Mbps.

Based on the data transfer rate 406, block 818 discontinues presentation of the repeatable frames 140. In some implementations, discontinuance may be delayed until the buffer 138 has stored a predetermined number of video frames 112.

Figure 9:
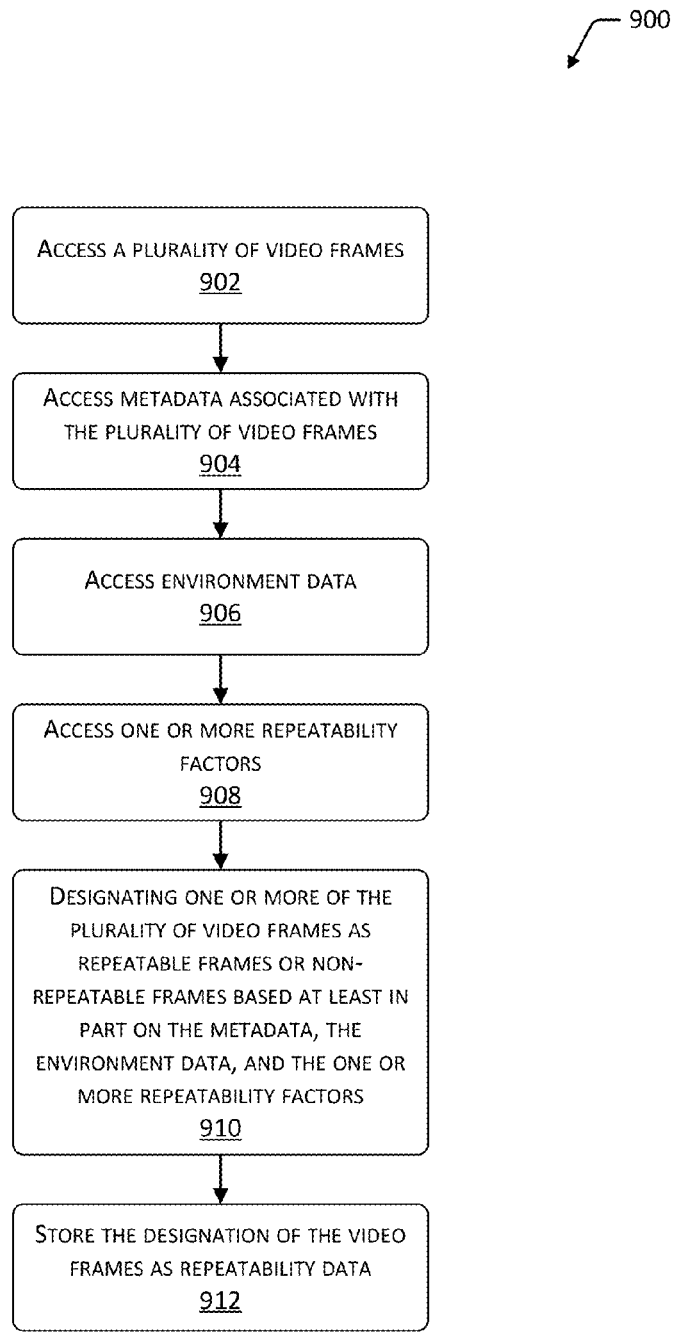
FIG. 9 is a flow diagram of generating repeatability data indicating repeatable frames, non-repeatable frames, or both, using repeatability factors.

FIG. 9 is a flow diagram 900 of generating the repeatability data 136 indicating repeatable frames 140, non-repeatable frames 144, or both, using one or more repeatability factors 134. The presentation module 128, the frame analysis module 130, or both may implement this process.

Block 902 accesses a plurality of video frames 112. For example, the video frames 112(A)-(F) may be stored in the buffer 138 on the media device 104.

Block 904 accesses metadata 108 associated with the video frames 112(A)-(F). For example, the metadata 108 may be stored in the memory 610, the buffer 138, or both.

Block 906 accesses the environment data 132. As described above, the environment data 132 may include information associated with one or more of the media devices 104, the content server 120, networking devices, and so forth.

Block 908 accesses one or more repeatability factors 134. As described above with respect to FIG. 5, the repeatability factors 134 may include the frame size threshold 134(1), the pixel change threshold 134(2), the moved object threshold 134(3), the motion vector threshold 134(4), the frame rate threshold 134(5), the display resolution threshold 134(6), the viewing distance threshold 134(7), and so forth.

Block 910 designates one or more of the plurality of video frames 112(A)-(F) as repeatable frames 140 or non-repeatable frames 144. The designation may be based at least in part on analysis of the one or more repeatability factors 134 with respect to one or more of the metadata 108, the environment data 132, or other information.

The environment data 132 may include one or more of native resolution of an output display device 132(1), physical viewing distance 132(2) between a user and the output device, or maximum data transfer rate 132(3).

Block 912 stores the designation of the video frames 112(A)-(F) as repeatability data 136. For example, the designations may be embedded or encoded within the video frames 112 or stored as a separate lookup file.

Figure 10:
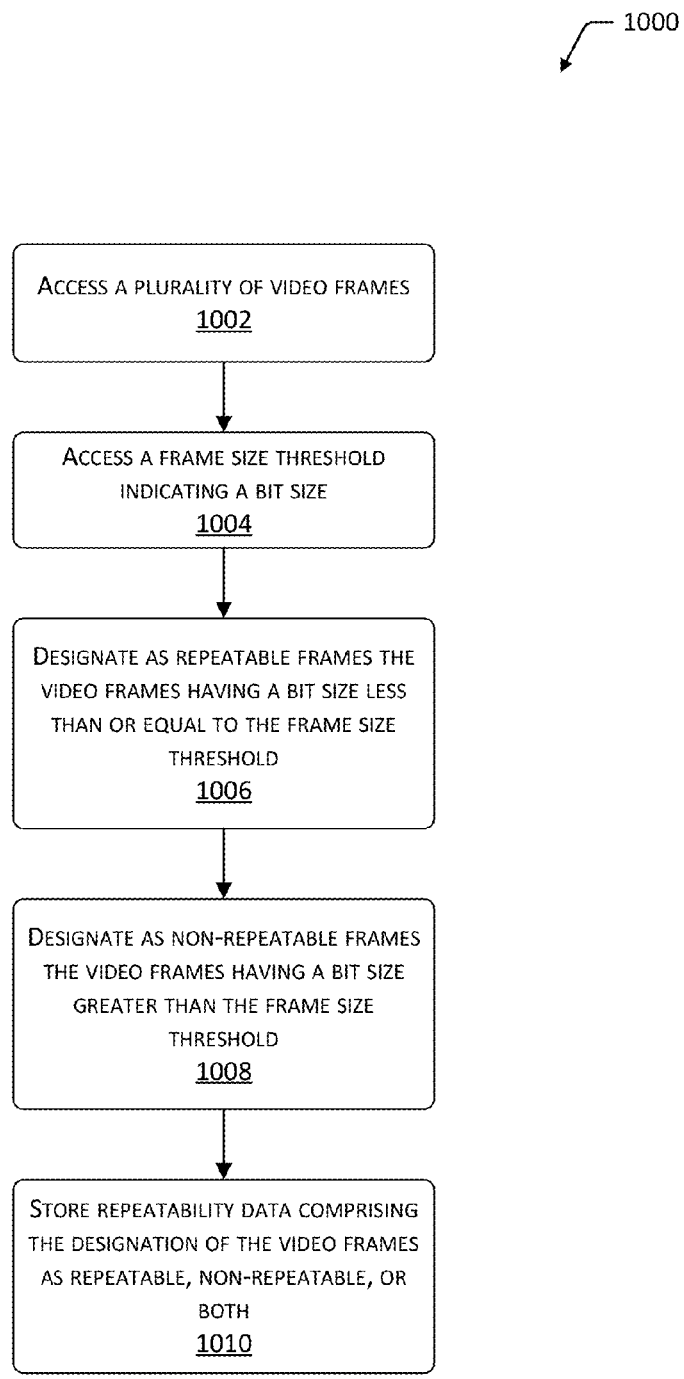
FIG. 10 is a flow diagram of generating repeatability data based on bit size of the video frames.

FIG. 10 is a flow diagram 1000 of generating the repeatability data 136 based on bit size of the video frames 112. The presentation module 128, the frame analysis module 130, or both may implement this process.

Block 1002 accesses a plurality of video frames 112. For example, the video frames 112(A)-(F) may be stored in the buffer 138 on the media device 104.

Block 1004 accesses a frame size threshold 134(1). As described above with regard to FIG. 5, the frame size threshold 134(1) specifies a size of the video frame 112 in terms of bits, bytes, a dimensionless value, a relative value, and so forth. The size of the video frame 112 indicates a quantity of data that the video frame 112 will use, such as when stored in CRSM or transmitted along the network 118. In one implementation, the frame size threshold 134(1) may be specified in bits, bytes, kilobytes, and so forth. In another implementation, the frame size threshold 134(1) may be relative to other video frames 112 in the buffer 138. For example, the frame size threshold 134(1) may indicate a percentage threshold, percentile threshold, or count of video frames 112. Continuing the example, the frame size threshold 134(1) may specify the decile of video frames 112 having the smallest frame sizes in the buffer 138.

Block 1006 designates as repeatable frames 140 the video frames 112(A)-(F) having a size less than or equal to the frame size threshold 134(1). For example, the frame size threshold 134(1) may specify 240 kilobits and video frames 112 that have a frame size of less than 240 kilobits may be designated as repeatable frames 140. In situations where the video frames 112 are compressed, the size of the video frames 112 may be a indicative of whether the image in the video frame 112 varies with respect to an earlier or later video frame 112(X−1) or 112(X+2). For example, a set of video frames 112 for a still scene with little or no changes may be very small compared to a set of video frames 112 for a scene with a person juggling.

Block 1008 designates as non-repeatable frames 144 the video frames 112(A)-(F) having a size equal to or greater than the frame size threshold 134(1). Continuing the example above, those video frames 112 have a size of 408 kilobits may be designated as non-repeatable frames 144 as they are greater than the threshold of 240 kilobits. The non-repeatable frames 144 may be those associated with portions of a scene in which objects are noticeably moving, color in the image changes quickly, and so forth. The non-repeatable frames 144 are those for which repeated presentation may result in a negative user experience.

Block 1010 stores the repeatability data 136 comprising the designation of the repeatable frames 140, the non-repeatable frames 144, or both. For example, the repeatability data 136 may designate those video frames 112 that are repeatable frames 140. The repeatability data 136 may then be used by the presentation module 128 to determine which of the video frames 112(A)-(F) in the buffer 138 to present more than once.

Figure 11:
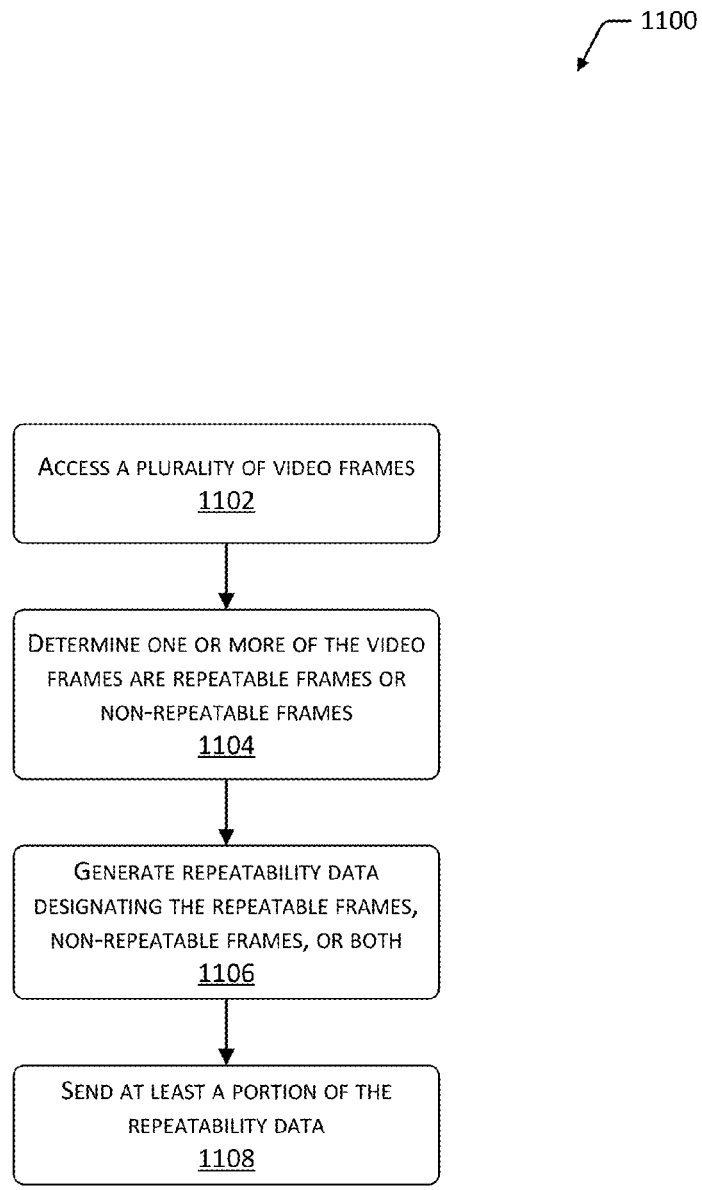
FIG. 11 is a flow diagram of a process of determining repeatable frames at the content server and providing repeatability data to the media device for use in determining which frames to repeat during a temporary drop in data transfer rate in content from the content server.

FIG. 11 is a flow diagram 1100 of a process of determining repeatable frames 140 at the content server 120 and providing repeatability data 136 to the media device 104 for use. The presentation module 128, the frame analysis module 130, or both may implement this process.

Block 1102 accesses a plurality of video frames 112. For example, the video frames 112(A)-(F) may be stored in the buffer 138 on the media device 104. In another example, the video frames 112 in the content 106 may be stored in the memory 710 of the content server 120.

Block 1104 determines one or more of the video frames 112 are repeatable frames 140 or are non-repeatable frames 144. As described above, the determination may include accessing one or more repeatability factors 134 and designating one or more of the plurality of video frames 112 as repeatable frames 140 based at least in part on the one or more repeatability factors 134.

Block 1106 generates the repeatability data 136. As described above, the repeatability data 136 comprises information designating the repeatable frames 140, the non-repeatable frames 144, or both.

Block 1108 sends at least a portion of the repeatability data 136 to another device. For example, the content server 120 may send the repeatability data 136 to the media device 104 using one of the communication interfaces 708. In another example, one media device 104(1) may send the repeatability data 136 to another media device 104(2) using one of the communication interfaces 608.

The repeatability data 136 may be provided as a separate file, such as within the content 106. In another implementation, the repeatability data 136 may be embedded within the one or more of the video frames 112. For example, the repeatability data 136 may be included in compression information associated with a video frame 112, encoded within a pixel, and so forth.

The media device 104 may receive the repeatability data 136. The presentation module 128 may then use the repeatability data 136 to present on a display output device at least a portion of the repeatable frames 140 more than once. For example, the repeatability data 136 may be embedded within the video frames 112. The presentation module 128 may be configured to recover this embedded information and duplicate the presentation of a video frame 112 based on this information. Where the repeatability data 136 is provided, the media device 104 may omit the frame analysis module 130.

Those having ordinary skill in the art will readily recognize that certain steps or operations illustrated in the figures above can be eliminated or taken in an alternate order. Moreover, the methods described above may be implemented as one or more software programs for a computer system and are encoded in a computer readable storage medium as instructions executable on one or more processors.

Embodiments may be provided as a computer program product including a non-transitory computer readable storage medium having stored thereon instructions (in compressed or uncompressed form) that may be used to program a computer (or other electronic device) to perform processes or methods described herein. The computer readable storage medium can be any one of an electronic storage medium, a magnetic storage medium, an optical storage medium, a quantum storage medium, and so forth. For example, the computer readable storage media may include, but is not limited to, hard drives, floppy diskettes, optical disks, read-only memories ("ROMs"), random access memories ("RAMs"), erasable programmable ROMs ("EPROMs"), electrically erasable programmable ROMs ("EEPROMs"), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals transferred by one or more networks. For example, the transitory machine-readable signal may comprise transmission of software by a network such as the Internet.

Separate instances of these programs can be executed on or distributed across separate computer systems. Thus, although certain steps have been described as being performed by certain devices, software programs, processes, or entities, this need not be the case and a variety of alternative implementations will be understood by those having ordinary skill in the art.

Additionally, those having ordinary skill in the art will readily recognize that the techniques described above can be utilized in a variety of devices, environments, and situations. Although the present disclosure is written with respect to specific embodiments and implementations, various changes and modifications may be suggested to one skilled in the art, and it is intended that the present disclosure encompass such changes and modifications that fall within the scope of the appended claims.

What is claimed is:

1. A system, comprising:
    at least one network interface configured to communicatively couple to one or more networks;
    at least one memory storing computer-executable instructions; and
    at least one processor communicatively coupled to the at least one memory, communicatively coupled to the at least one network interface, and configured to execute the computer-executable instructions to:
        receive video frames using the at least one communication interface;
        store the video frames in a buffer;
        determine, using one or more repeatability factors, that a first video frame in the buffer is a repeatable frame;
        present at least a portion of the video frames in the buffer;
        determine that a data transfer rate for receiving the video frames is below a threshold;
        present the repeatable frame previously stored in the buffer one or more times;
        receive additional video frames;
        determine that the data transfer rate for receiving the video frames has reached or exceeded the threshold; and
        based on the data transfer rate, discontinue presentation of the repeatable frame.

2. The system of claim 1, wherein the determination of the repeatable frame in the buffer is based at least in part on the one or more repeatability factors including:
    a frame size threshold,
    a pixel change threshold,
    a moved object threshold,
    a motion vector threshold,
    a frame rate threshold,
    a display resolution threshold, or
    a viewing distance threshold.

3. The system of claim 1, wherein the threshold is based on a buffer refill rate and a buffer empty rate, and further wherein:
    the buffer refill rate indicates a number of frames entering the buffer per unit of time, and
    the buffer empty rate indicates a number of frames removed from the buffer per unit of time.

4. A computer-implemented method for utilizing a computerized system, the computer-implemented method comprising:
    accessing a plurality of video frames stored in a buffer;
    determining, using one or more repeatability factors, that a first video frame of the plurality of video frames is repeatable; receiving additional video frames at a rate below a threshold value; presenting the plurality of video frames stored in the buffer; and responsive to the additional video frames being received at the rate below the threshold value; accessing the repeatable first video frame previously stored in the buffer again;
    and presenting again the first video frame as previously stored in the buffer.

5. The method of claim 4, wherein the threshold value specifies a minimum data transfer rate to receive the additional video frames.

6. The method of claim 4, wherein the threshold value is based at least in part on a buffer refill rate and a buffer empty rate.

7. The method of claim 4, the determining the first video frame is repeatable comprising:
   accessing metadata associated with the plurality of video frames;
   accessing environment data associated with the computerized system;
   accessing one or more repeatability factors; and
   designating the first video frame is a repeatable frame or a non-repeatable frame based at least in part on analysis of the one or more repeatability factors with respect to the metadata and the environment data.

8. The method of claim 7, wherein the one or more repeatability factors comprise:
   a frame size threshold,
   a pixel change threshold,
   a moved object threshold,
   a motion vector threshold,
   a frame rate threshold,
   a display resolution threshold, or
   a viewing distance threshold.

9. The method of claim 7, wherein the designating is further based at least in part on environment data comprising one or more of:
   native resolution of an output device display, or
   physical viewing distance between a user and the output device.

10. The method of claim 4, wherein:
    the plurality of video frames are compressed; and
    the determining the first video frame is repeatable comprises:
       accessing a frame size threshold indicative of a bit size; and
       designating as repeatable the first video frame having a bit size less than or equal to the frame size threshold.

11. The method of claim 4, further comprising:
    receiving compressed data from a server using a wide area network;
    decoding the compressed data to generate the plurality of video frames; and
    storing the plurality of video frames in the buffer.

12. The method of claim 4, further comprising:
    receiving compressed data from a media device using a local area network or a personal area network;
    decoding the compressed data to generate the plurality of video frames; and
    storing the plurality of video frames in the buffer.

13. A computer-implemented method for utilizing a computerized system, the computer-implemented method comprising:
    accessing a plurality of video frames;
    determining a video frame from the plurality of video frames is repeatable based at least in part on one or more repeatability factors;
    generating repeatability data indicating that the video frames is repeatable; determining that a metric associated with transfer of at least a portion of the plurality of video frames to a media device is below a threshold; presenting the plurality of video frames using a display output device of the media device; and responsive to determining that the metric is below a threshold, presenting the repeatable video frame one or more additional times using the display output device of the media device, wherein the repeatable video frame is stored in a buffer of the media device.

14. The method of claim 13, sending the repeatability data to the media device using a communication interface.

15. The method of claim 13, the computer-implemented method further comprising:
    accessing the one or more repeatability factors, wherein the one or more repeatability factors include a frame size threshold; and
    determining that the one or more video frames of the plurality of video frames are repeatable based at least in part on the one or more repeatability factors.

16. The method of claim 15, further comprising:
    accessing metadata associated with the plurality of video frames;
    accessing environment data associated with the computerized system; and
    wherein the determining the video frame is repeatable is further based at least in part on the metadata and the environment data.

17. The method of claim 13, wherein the plurality of video frames are compressed; and
    determining the one or more video frames are repeatable comprises:
       accessing bit size data indicative of a quantity of bits used by the video frames;
       accessing a frame size threshold; and
       designating as repeatable the video frames having a bit size less than or equal to the frame size threshold.

18. The method of claim 13, further comprising embedding the repeatability data within the video frame designated as repeatable.

19. The method of claim 13, further comprising:
    sending at least a portion of the plurality of video frames to the media device; and
    sending at least a portion of the repeatability data to the media device.

20. The method of claim 13, wherein the metric associated with transfer of the plurality of video frames to a media device is indicative of a data transfer rate.

* * * * *